(12) United States Patent
Krishna et al.

(10) Patent No.: US 8,986,516 B2
(45) Date of Patent: Mar. 24, 2015

(54) OPTICAL RELEASE OF HYDROGEN FROM FUNCTIONALIZED FULLERENES AS STORAGE MATERIALS

(75) Inventors: Vijay Krishna, Gainesville, FL (US); Brij M. Moudgil, Gainesville, FL (US); Benjamin L. Koopman, Gainesville, FL (US)

(73) Assignee: University of Florida Research Foundation, Inc., Gainsville, FL (US)

( * ) Notice: Subject to any disclaimer, the term of this patent is extended or adjusted under 35 U.S.C. 154(b) by 483 days.

(21) Appl. No.: 12/810,261

(22) PCT Filed: Jan. 5, 2009

(86) PCT No.: PCT/US2009/030109
§ 371 (c)(1),
(2), (4) Date: Sep. 13, 2010

(87) PCT Pub. No.: WO2009/089153
PCT Pub. Date: Jul. 16, 2009

(65) Prior Publication Data
US 2011/0000781 A1    Jan. 6, 2011

Related U.S. Application Data

(60) Provisional application No. 61/010,165, filed on Jan. 4, 2008.

(51) Int. Cl.
*C01B 3/00* (2006.01)
*B82Y 30/00* (2011.01)
(Continued)

(52) U.S. Cl.
CPC ............... *C01B 3/0021* (2013.01); *B82Y 30/00* (2013.01); *B82Y 40/00* (2013.01); *C01B 3/0078* (2013.01); *C01B 31/0206* (2013.01); *C01B 31/0213* (2013.01); *Y02E 60/325* (2013.01)
USPC ............ 204/157.52; 204/157.43; 204/157.15; 204/157.44

(58) Field of Classification Search
CPC   C01B 3/0021; C01B 3/0078; C01B 31/0206; C01B 31/0123; Y02E 60/325
USPC ............. 204/157.15, 157.52, 157.43, 157.44; 977/948, 735, 740, 734, 748
See application file for complete search history.

(56) References Cited

U.S. PATENT DOCUMENTS 5,376,353 A * 12/1994 Vasilevskis .................. 423/591
5,470,680 A * 11/1995 Loutfy et al. ................. 977/842
(Continued)

FOREIGN PATENT DOCUMENTS

CN           1789121       6/2006
WO    WO 2004-108590    12/2004

OTHER PUBLICATIONS

Dennler et al, "A self-rechargeable and flexible polymer solar battery," Solar Energy vol. 81, pp. 947-957 (2007).*
(Continued)

*Primary Examiner* — Colleen M Raphael
(74) *Attorney, Agent, or Firm* — Saliwanchik, Lloyd & Eisenschenk

(57) ABSTRACT

A method to release hydrogen from a material comprising hydrogen fixed fullerenes involves irradiating the hydrogen fixed fullerenes with electromagnetic radiation of sufficient intensity to release hydrogen rapidly upon irradiation. The intensity of the irradiation and/or the area of irradiation can be adjusted to control the rate and extent of hydrogen release. The hydrogen depleted material comprising hydrogen fixed fullerene can be hydrogenated to regenerate the material.

7 Claims, 1 Drawing Sheet

(51) Int. Cl.
*B82Y 40/00* (2011.01)
*C01B 31/00* (2006.01)
*C01B 31/02* (2006.01)

(56) References Cited

U.S. PATENT DOCUMENTS

| | | | |
|---|---|---|---|
| 6,113,673 | A | 9/2000 | Loutfy et al. |
| 6,280,677 | B1 * | 8/2001 | Yakobson ............. 977/742 |
| 6,290,753 | B1 * | 9/2001 | Maeland et al. .......... 977/742 |
| 6,953,564 | B2 * | 10/2005 | Kawakami et al. ........... 977/842 |
| 7,407,640 | B2 * | 8/2008 | Barrera et al. ........... 204/157.43 |
| 7,476,375 | B1 * | 1/2009 | Miller ........................ 977/734 |
| 7,547,429 | B2 * | 6/2009 | Nakamura et al. ........... 977/734 |
| 8,153,554 | B2 * | 4/2012 | Ritter et al. ................ 502/414 |
| 2001/0016283 | A1 | 8/2001 | Shiraishi et al. |
| 2004/0180244 | A1 * | 9/2004 | Tour et al. ....................... 429/13 |
| 2005/0007001 | A1 * | 1/2005 | Imholt et al. ............ 313/231.31 |
| 2005/0175885 | A1 | 8/2005 | Imholt et al. |
| 2009/0086877 | A1 * | 4/2009 | Hagelstein et al. ............ 376/100 |
| 2010/0135899 | A1 * | 6/2010 | Luo et al. ................. 204/157.52 |
| 2010/0221137 | A1 * | 9/2010 | Shivaram et al. ................. 420/8 |

OTHER PUBLICATIONS

Shi et al, "Research frontier on new materials and concepts for hydrogen storage," Intl J. of Hydrogen Energy vol. 32 (2007) pp. 224-228.*

Murata et al, "100% Encapsulation of a Hydrogen Molecule into an Open-Cage Fullerene Derivative and Gas-Phase Generation of H2@C60," JACS Communications, published on Web May 21, 2003.*

Pekker et al, "Hydrogenation of Carbon Nanotubes and Graphite in Liquid Ammonia," J. Phys. Chem. B 2001, vol. 105, pp. 7938-7943.*

Ma et al, "Hydrogen storage capacity in single-walled carbon nanotubes," Phys. Rev. B vol. 65, 155430 (2002).*

Gundiah et al, "Hydrogen storage in carbon nanotubes and related materials," J. Mater. Chem., vol. 13, pp. 209-213 (2003; published as an advance article on the web Nov. 28, 2002).*

Pradhan et al, "Large cryogenic storage of hydrogen in carbon nanotubes at low pressures," J. Mater. Res., vol. 17, No. 9, Sep. 2002, pp. 2209-2216.*

Yakobson et al, "Fullerene Nanotubes: C1,000,000 and Beyond," American Scientist, Jul.-Aug. 1997, p. 2, para. 4, line 1, emphasis added, available online at http://www.americanscientist.org/issues/num2/fullerene-nanotubes-c1000000-and-beyond/1.*

Rogner et al, "Hydrogenated and chlorinated fullerenes detected by 'cooled' modified matrix-assisted laser desorption and ionisation mass spectroscopy (MALDI-MS)," Intl J. of Mass. Spect. and Ion Processes 156 (1996) 103-108.*

Jin et al, "Direct Solid-Phase Hydrogenation of Fullerenes," J. Phys. Chem. 98 (1994) 4215-4217.*

Vasil'ev et al, "From major to minor and back—a decisive assessment of C60H36 with respect to the Birch reduction of C60," Chem. Comm. 2000, pp. 1233-1234.*

Möder et al, "Unimolecular ion dissociation and laser-induced coalescence of hydrogenated fullerenes," Int'l J. Mass. Spec. 195/196 (2000), pp. 599-607.*

Lobach, A.S. et al., "Preparation and study of hydrides of fullerenes $C_{60}$ and $C_{70}$," *Russian Chemical Bulletin*, Apr. 1997, pp. 641-678, vol. 46, No. 4.

Loutfy, R.O. et al., "Feasibility of Fullerene Hydride as a High Capacity Hydrogen Storage Material," *Proceedings of the 2001 DOE Hydrogen Program Review*.

Zhao, Y. et al., "Hydrogen Storage in Novel Organometallic Buckyballs," *Physical Review Letters*, 2005, pp. 155504, 1-4, vol. 94.

\* cited by examiner

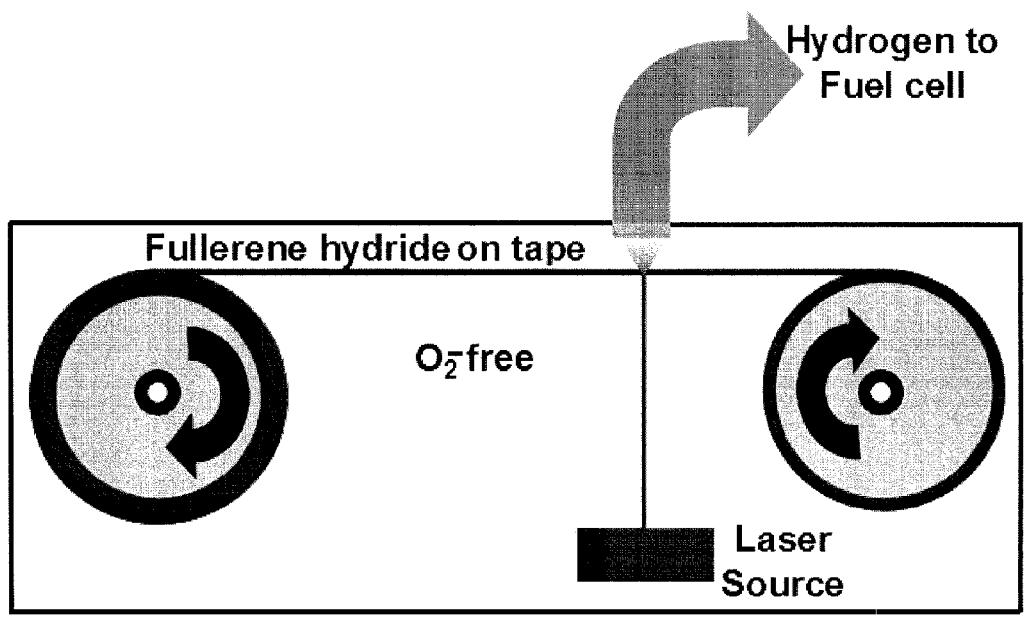

OPTICAL RELEASE OF HYDROGEN FROM FUNCTIONALIZED FULLERENES AS STORAGE MATERIALS

CROSS-REFERENCE TO RELATED APPLICATION(S)

This application is the U.S. national stage application of International Patent Application No. PCT/US2009/030109, filed Jan. 5, 2009, which claims the benefit of U.S. Provisional Application Ser. No. 61/010,165, filed Jan. 4, 2008, the disclosures of which are hereby incorporated by reference in their entireties, including any figures, tables, or drawings.

The subject invention was made with government support under the National Science Foundation, Contract No. EEC9402989. The government has certain rights to this invention.

BACKGROUND OF THE INVENTION

The evolution from a society powered by hydrocarbon fuels to one powered by hydrogen requires new systems for hydrogen storage and release where the storage and release system can be reused or recycled. Therefore, hydrogen storage and release is currently being researched as an alternative energy source for fuel cells. This is particularly necessary for those power systems involved with transportation where hydrogen must be contained safely in sufficient quantity to travel a reasonable distance. Given the efficiency of existing fuel cell technology, the typical weight of an average vehicle, and the average distance traveled between refueling stops of a current vehicle, target goals for hydrogen storage systems of 2 kWh/kg (6 weight percent $H_2$) by 2010 and 3 kWh/kg (9 weight percent $H_2$) by 2015 have been set by the U.S. Department of Energy. These targeted capacities are inherently difficult to achieve as liquid hydrogen has a gravimetric capacity of just over 5 weight percent, and the target goals include the mass of the storage tank and balance of plant components for delivery in addition to the mass of the storage medium. The goals have been addressed by various methods of fixing hydrogen.

The fixation of hydrogen by physisorption or by chemisorption is currently under active investigation. These storage systems are generally considered as being "on-board reversible" or "regenerable off-board" depending on whether the material can be refueled with hydrogen while in a vehicle or whether the material must be removed from the vehicle for refueling with hydrogen, respectively. The material must be able to fix hydrogen at a relatively low temperature and pressure at a reasonable rate to be viewed as on-board reversible. A variety of materials, such as metal or complex hydrides, alanates and carbon nanostructures, are being studied for hydrogen storage. A material suitable for hydrogen storage should satisfy three basic requirements: high density storage of hydrogen; stability of stored hydrogen; and release of hydrogen from the material on demand at a relatively low energy input. Appropriate systems for chemisorption have been identified as those with reaction enthalpies of 15 to 75 kJ/mole. Systems with enthalpies significantly below 15 kJ/mole are generally excluded from consideration as being insufficiently irreversible. Materials with reaction enthalpies of 15 to 75 kJ/mole are often not viable for storage systems because of kinetic considerations. Several high density storage materials, such as metal hydrides, require heating at elevated temperatures (>100° C.) for release of hydrogen, making them unattractive for commercial applications. For example, the release of hydrogen by $Ca(AlH_4)_2$ has a reaction enthalpy of only 14 kJ/mole but does not release any $H_2$ until temperatures exceed 200° C. No material that shows hydrogen release at temperatures below 100° C. has been identified as a viable candidate.

One approach to a storage system is the absorption of hydrogen on a carbon based absorbent or other nanostructured materials. Such systems have been examined for thermolytic release of hydrogen in a manner that the supporting carbon absorbent can be reused. For example, single-walled carbon nanotubes have been examined but have not been able to achieve the 6 weight percent hydrogen fixation target. The achievement of this level by carbon nanotubes is not anticipated from the data produced to date.

As opposed to the physisorption on carbon, the chemisorption on fullerenes, with or without transition metals, has been examined and can achieve the 6 weight percent target. The hydrogen content of a 1:1 H:C fullerene hydride is 7.7 weight percent and a hydrogen content of 6.3 weight percent has been achieved experimentally by Birch reduction of $C_{60}$ and 6.1 weight percent has been achieved by direct hydrogenation of $C_{60}$. To carry out direct hydrogenation of $C_{60}$, temperatures of at least 400° C. and a pressure of at least 60 MPa is required in spite of the hydrogenation process being exothermic, with an enthalpy of about 60 kJ/mole. The activation energy for uncatalyzed hydrogenation is about 100 kJ/mole. Therefore, the activation energy for the endothermic dehydrogenation of the fullerene hydride is about 160 kJ/mole, which requires even higher temperatures to promote dehydrogenation. The dehydrogenation of crystalline $C_{60}H_{30}$ requires a temperature of 800° C. to cleanly separate the hydrogen from the intact $C_{60}$. Additionally, the fullerene hydrides are free of many potentially hazardous properties, such as a spontaneous reactivity with oxygen and/or moisture. Recently, Zhao, Y. et al. ("Hydrogen Storage in Novel Organometallic Buckyballs," *Physical Review Letters* 2005, 94, 155504, 1-4) indicates that $C_{60}$ can potentially store as much as 9 weight percent hydrogen.

Hence, although fullerenes have been identified as promising recyclable hydrogen storage media, an efficient mode for release of the hydrogen at viable release temperatures remains a goal.

BRIEF SUMMARY OF THE INVENTION

A material comprising hydrogen fixed fullerenes can release hydrogen upon irradiation in the absence of oxygen. The hydrogen fixed fullerene can be a fullerene hydride, for example, $C_{60}H_x$, where x is 2 to 60; a fullerene with other functional groups on the fullerene cage, for example, titanium modified fullerene; or can be a hydrogen fixed fullerene combined with an additional material, for example, a polymeric tape with a fullerene hydride coating. The radiation source can be a laser beam but can also be an incoherent light source. The release of hydrogen is rapid upon irradiation, where the rate of release can be controlled by the amount of the hydrogen fixed fullerene irradiated at a given time and the intensity of the radiation. The material comprising hydrogen fixed fullerenes that is hydrogen depleted can be rehydrogenated and recycled.

BRIEF DESCRIPTION OF THE DRAWINGS

FIG. 1 is a schematic of a hydrogen release system, where a material comprising hydrogen fixed fullerenes in the form of a fullerene hydride coated tape is transferred from one spool to a second spool where a laser beam is projected onto the tape to release hydrogen during transfer.

DETAILED DESCRIPTION OF THE INVENTION

Functionalized fullerenes undergo spontaneous combustion upon electromagnetic irradiation in air. However, irradiation of a material comprising hydrogen fixed fullerenes, using a radiation of sufficient intensity, allows for the controlled release of hydrogen at the site of irradiation in the absence of oxygen. The release can occur at a sufficient temperature and heat from the irradiated hydrogen fixed fullerene can be readily dissipated from the system such that the temperature does not significantly exceed the temperature required for the thermal release of the hydrogen.

The hydrogen depleted hydrogen fixed fullerene can be re-hydrogenated and reused. The hydrogenation of the depleted hydrogen fixed fullerene can be carried out by any known method including heating under a pressure of hydrogen. A catalyst can be included with the depleted hydrogen fixed fullerenes to increase the rate of hydrogenation.

The irradiation is carried out in an oxygen free environment to avoid any irradiation induced combustion of the hydrogen fixed fullerenes. The oxygen free environment can be any non-oxidizing environment such as a non-oxidizing gas, a vacuum, or within an oxygen free matrix which acts as a barrier to diffusion of oxygen to the hydrogen fixed fullerenes. The hydrogen fixed fullerenes can be irradiated with any electromagnetic radiation, such as a laser beam or a radio wave. The radiation source can be coherent or incoherent. The wavelength of the radiation can range from $10^{-12}$ m to $10^{12}$ m, which includes gamma rays, x-rays, extreme ultraviolet, ultraviolet, visible, infrared, microwave, radio wave, or any combination thereof. The hydrogen release is rapid upon irradiation with a sufficient intensity. The rate of release can be controlled by the area of hydrogen fixed fullerenes irradiated and the intensity of the radiation source, where irradiation intensities are greater than about 1 mW/m$^2$.

For the purpose of this invention, the term "fullerene" is used to define a general class of molecules that exists essentially in the shape of a three dimensional polyhedron containing from 20 to 1500 carbon atoms, and which comprises carbon atoms as the predominant element from which they are composed. The fullerenes include, but are not limited to C-28, C-32, C-44, C-50, C-58, C-60, C-70, C-84, C-94, C-250 and C-540. (According to this nomenclature, the fullerene that contains 60 carbon atoms is denoted C-60, the fullerene that contains 70 carbon atoms is denoted C-70, etc.) The hydrogen fixed fullerenes included in the material can have various functional groups bonded to the fullerene cage via covalent bonds, ionic bonds, Dewar coordination, Kubas interactions, or mixtures thereof. The hydrogen fixed fullerene can be a fullerene hydride of the molecular formula $C_xH_y$ where x is 20 to 1500 and y is 1 to x, for example $C_{60}H_{36}$. For the purpose of the invention the hydrogen fixed fullerene can have functional groups other than hydrogen attached to the cage. The functional groups can be inorganic, including, but not exclusive to, —OH, —Br, —Ti, and other metals; organic, including, but not exclusive to, C(COOH)$_2$; or any combination thereof along with hydrogen functional groups —H and/or —H$_2$. When present, the number of non-hydrogen functional groups attached per cage of fullerene can be from 1 up to about half of the number of carbons in the fullerene cage or more. The hydrogen fixed fullerene can be $C_xM_yH_z$, where M is a metal, x is 28 to 1500, y is 1 to x, and z is 2 to x. The metal can be, for example Ti, Cr, Mo, W, Fe, Co, Ni, Cu, Rh, Ru, Sn, Li, Na, K, Be, Mg, Ca, Al, Si or La.

The hydrogen fixed fullerenes included in the material can be those where hydrogen is fixed to substituted fullerenes. Substituted fullerenes have one or more of the atoms comprising the fullerene cage structure being an atom other than a carbon as in a fullerene, yet essentially retain the geometry of a polyhedron upon being so substituted. Also included among the hydrogen fixed fullerenes for the purpose of the invention are hydrogen fixed to endohedral fullerenes, in which atoms of elements other than carbon (e.g., titanium, hydrogen) reside inside the cage structure of fullerenes.

The material comprising hydrogen fixed fullerenes can include a carrier or matrix to secure, orient and/or keep oxygen from the hydrogen fixed fullerene. The carrier/matrix can be an organic gas, liquid or solid; an inorganic gas, liquid, or solid; a polymer or polymer composite; water, an aqueous solution or aqueous suspension; a metal or metal alloy; a glass or ceramic; a biological or biologically derived material or any mixture of these materials. For example, in one embodiment, hydrogen fixed fullerenes can be coated on a polymeric tape. Release can be sustained by irradiating different portions of the hydrogen fixed fullerene coated tape over time. For example, as illustrated in FIG. 1 a hydrogen fixed fullerene coated tape can be rolled from one spool to another where irradiation of the tape can occur while the tape is being transferred. The hydrogen depleted tape may be removed and replaced with a fresh tape coated with hydrogen fixed fullerene. Tapes of hydrogen fixed fullerene can be used in a "regenerable off-board" system. At a vehicle refueling site, a spool of depleted hydrogen fixed fullerene comprising tape can be replaced with a regenerated spool.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method of releasing stored hydrogen consisting essentially of the steps of:
   providing hydrogen fixed fullerenes wherein said hydrogen fixed fullerenes are: $C_xH_y$, wherein x is 28 to 1500 and y is 2 to x; or $C_xM_yH_z$, where M is Ti, Cr, Mo, W, Fe, Co, Ni, Cu, Rh, Ru, Sn, Li, Na, K, Be, Mg, Ca, Al, Si or La, x is 28 to 1500, y is 1 to x, and z is 2 to x;
   providing a polymer tape as a carrier for the hydrogen fixed fullerenes, and
   irradiating said hydrogen fixed fullerenes in a substantially oxygen free environment and catalyst-free environment, with electromagnetic radiation of a sufficient intensity, whereupon absorption of said electromagnetic radiation by said hydrogen fixed fullerenes results in dehydrogenation such that resulting depleted hydrogen fixed fullerenes are capable of rehydrogenation to said hydrogen fixed fullerenes.

2. The method of claim 1, wherein said electromagnetic radiation ranges from $10^{-12}$ m to $10^{12}$ m in wavelength and comprises gamma rays, x-rays, extreme ultraviolet, ultraviolet, visible, infrared, microwave, radio wave or any combination thereof.

3. The method of claim 2, wherein said electromagnetic radiation is coherent or incoherent.

4. The method of claim 1, wherein said oxygen free environment comprises a vacuum or a non-oxidizing gas atmosphere.

5. The method of claim 1, wherein said hydrogen fixed fullerenes comprise hydrogen fixed to fullerenes, endohedral fullerenes, substituted fullerenes, functionalized fullerenes, or any mixture thereof.

6. A regenerable off-board system for hydrogenating, storing, and dehydrogenating fullerenes comprising:
   hydrogen fixed fullerenes wherein said hydrogen fixed fullerenes are: $C_xH_y$, wherein x is 28 to 1500 and y is 2 to x; or $C_xM_yH_z$, where M is Ti, Cr, Mo, W, Fe, Co, Ni, Cu, Rh, Ru, Sn, Li, Na, K, Be, Mg, Ca, Al, Si or La, x is 28 to 1500, y is 1 to x, and z is 2 to x;
   a polymer tape carrying hydrogen fixed fullerenes wound on a first spool and a second spool for rolling from said first spool to said second spool in a substantially oxygen free environment,
   a source of electromagnetic radiation intensities of at least 1 mW/m$^2$ for irradiating said hydrogen fixed fullerenes on said polymeric tape situated to irradiate said polymeric tape while the tape is rolled from said first spool to said second spool wherein said second spool is wound with hydrogen depleted fullerenes.

7. A method of releasing stored hydrogen consisting of the steps of:
   providing hydrogen fixed fullerenes wherein said hydrogen fixed fullerenes are: $C_xH_y$, wherein x is 28 to 1500 and y is 2 to x; or $C_xM_yH_z$, where M is Ti, Cr, Mo, W, Fe, Co, Ni, Cu, Rh, Ru, Sn, Li, Na, K, Be, Mg, Ca, Al, Si or La, x is 28 to 1500, y is 1 to x, and z is 2 to x;
   providing a polymer tape as a carrier for the hydrogen fixed fullerenes, and
   irradiating said hydrogen fixed fullerenes in a substantially oxygen free environment with electromagnetic radiation of an intensity of at least 1 mW/m$^2$, whereupon absorption of said electromagnetic radiation by said hydrogen fixed fullerenes results in dehydrogenation such that resulting depleted hydrogen fixed fullerenes are capable of rehydrogenation to said hydrogen fixed fullerenes.

* * * * *

UNITED STATES PATENT AND TRADEMARK OFFICE
CERTIFICATE OF CORRECTION

PATENT NO. : 8,986,516 B2
APPLICATION NO. : 12/810261
DATED : March 24, 2015
INVENTOR(S) : Vijay Krishna, Brij M. Moudgil and Benjamin L. Koopman Page 1 of 1

It is certified that error appears in the above-identified patent and that said Letters Patent is hereby corrected as shown below:

Claims

Column 5,
Line 18, claim 6 "free environment," should read --free environment; and--.

Column 6,
Line 12, claim 7 "fullerenes, and" should read --fullerenes; and--.

Signed and Sealed this
Twenty-ninth Day of March, 2016

Michelle K. Lee
*Director of the United States Patent and Trademark Office*